United States Patent Office 3,539,656
Patented Nov. 10, 1970

3,539,656
HYDROLYTICALLY STABLE SILOXANE-POLY-
ARYLENE POLYETHER COPOLYMERS
Allen Noshay, East Brunswick, Markus Matzner, Edison, and Charles N. Merriam, Martinsville, N.J., assignors to Union Carbide Corporation, a corporation of New York
No Drawing. Filed Mar. 21, 1968, Ser. No. 714,768
Int. Cl. C08g 47/10
U.S. Cl. 260—824     8 Claims

ABSTRACT OF THE DISCLOSURE

Hydrolytically stable siloxane-polyarylene polyether copolymers having at least one siloxane chain and at least one polyarylene polyether chain each linked by an aryloxy to silicon bond.

BACKGROUND

This invention relates to organopolysiloxane-polyarylene polyether amorphous copolymers. More particularly, this invention relates to hydrolytically stable siloxane-polyarylene polyether copolymers.

The inherent hydrolytic stability of the copolymers of this invention is unexpected based on the known hydrolytic instability of compounds containing aryloxy-silicon linkages.

SUMMARY

The copolymers of this invention are siloxane-polyarylene polyether copolymers comprising (a) at least one siloxane chain having at least two siloxane units represented by the formula

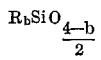

wherein R is a monovalent hydrocarbon group or ether oxygen (—O—) and b has a value from 1 to 3 inclusive and (b) at least one linear thermoplastic polyarylene polyether chain composed of recurring units having the formula

—O—E—O—E'— wherein E is the residuum of a dihydric phenol and E' is the residuum of a benzenoid compound having an inert electron withdrawing group ortho or para to the valence bonds, both of said residua being valently bonded to the ether oxygens through aromatic carbon atoms. The siloxane chain and the polyarylene polyether chain are linked by an aryloxy to silicon bond.

DESCRIPTION

The hydrolytically stable copolymers of this invention contain from 0.3 to 99 percent by weight of siloxane and from 99.7 to 1 percent by weight of polyarylene polyether.

As stated above the copolymers of this invention contain siloxane chains having at least two siloxane units represented by the formula:

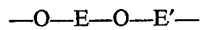

wherein R is a monovalent hydrocarbon group or ether oxygen (—O—) and b has a value from 1 to 3 inclusive. Each ether oxygen links a siloxane chain of the copolymer to a polyarylene polyether chain of the copolymer. The groups represented by R can be the same or different in any given siloxane unit or throughout the siloxane chain of the copolymers and the value of b in the various siloxane units in the siloxane chain of the copolymer can be the same or different. Each siloxane chain of the copolymer contains at least one unit represented by Formula 1 wherein at least one unit represented by R is ether oxygen.

Illustrative of the monovalent hydrocarbon groups that are represented by R in Formula 1 are the alkyl groups (for example, the methyl, ethyl, n-propyl, iso-propyl, n-butyl, sec-butyl, isobutyl, t-butyl, n-octyl, decyl, dodecyl groups), the cycloalkyl groups (for example, the cyclopropyl, cyclobutyl, cyclopentyl, cyclohexyl, cycloheptyl groups), the alkenyl groups (for example, the vinyl, allyl, crotyl, 3-butenyl, 1,3-butadienyl, allenyl groups), the cycloalkenyl groups (for example, the cyclopentenyl, cyclohexenyl groups), the alkynyl groups (for example, the ethynyl, propargyl groups), the aryl groups (for example, the phenyl, naphthyl, phenanthrenyl, anthracenyl groups), the aralkyl groups (for example, the benzyl, 2-phenylethyl, 2-phenyl propyl, cumyl groups), the alkaryl groups (for example, the tolyl, t-butyl phenyl, styryl, cyclohexyl phenyl groups). If desired such monovalent hydrocarbon groups can contain substituent functional groups replacing one or more of the hydrogens or carbons of the monovalent hydrocarbon moiety and illustrative of such substituted monovalent hydrocarbon groups are

| | |
|---|---|
| Bromomethyl | —CH$_2$Br |
| 1-chlorovinyl | —CCl=CH$_2$ |
| 3,3,3-trifluoropropyl | —CH$_2$CH$_2$CF$_3$ |
| Pentafluoroethoxy ethyl | —CH$_2$CH$_2$OCF$_2$CF$_3$ |
| 3-chloropropyl | —CH$_2$CH$_2$CH$_2$Cl |
| 3-hydroxypropyl | —CH$_2$CH$_2$CH$_2$OH |

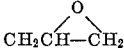

| | |
|---|---|
| 2-(t-butoxy)ethyl | —CH$_2$CH$_2$OC(CH$_3$)$_3$ |
| 2-cyanoethyl | —CH$_2$CH$_2$C≡N |
| 3-cyanopropyl | —CH$_2$CH$_2$CH$_2$C≡N |

| | |
|---|---|
| 3-aminopropyl | —CH$_2$CH$_2$CH$_2$NH$_2$ |
| 4-aminobutyl | —CH$_2$CH$_2$CH$_2$CH$_2$NH$_2$ |
| 3-isocyanatopropyl | —CH$_2$CH$_2$CH$_2$N=C=O |

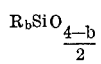

The copolymers can be produced by any number of reactions. Typical of such reactions showing only the reactive groups of the siloxane and polyarylene polyether chains are the following:

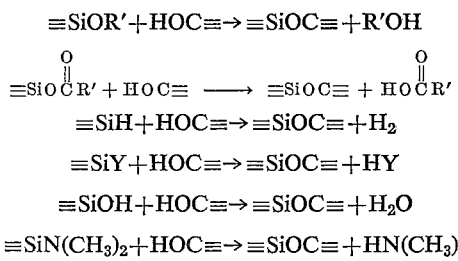

In the above equations, R' represents a monovalent alkyl or aryl group and Y represents a holagen atom or amino group, such as —NH₂, —NHZ, and —NZ_z wherein Z is a monovalent hydrocarbon radical. In addition, many other reactive groups can replace those shown in the above equations on either the siloxane or polyarylene polyether chains as is well known in the art.

The copolymers can contain siloxane units represented by Formula 1 wherein either the same hydrocarbon groups are attached to the silicon atoms (e.g., the dimethylsiloxy, diphenylsiloxy and diethylsiloxy groups) or different hydrocarbon groups are attached to the silicon atoms (e.g., the methylphenylsiloxy, methylvinylsiloxy, bromomethyldimethylsiloxy, meta-aminophenyldimethylsiloxy and the ethylphenylvinylsiloxy groups). These copolymers can contain one or more types of siloxane units that are represented by Formula 1 provided that at least one group has at least one ether oxygen.

The copolymers can contain trifunctional siloxane units (e.g., monomethylsiloxane groups, $CH_3SiO_{1.5}$), difunctional siloxane units (e.g., dimethylsiloxane units, $(CH_3)_2SiO$—), monofunctional siloxane units (e.g., bromomethyl dimethylsiloxane units, $BrCH_2(CH_3)_2SiO_{0.5}$), or combinations of these types of siloxane units having the same or different substituents. According to the average functionability of the siloxane units, the siloxane chain can be predominately linear, cyclic, branched or crosslinked or can have combinations of these structures. Preferably the siloxane chains of the copolymers are linear or predominately linear having small amounts of branching.

The residua, E and E' in Formula 2 are characterized as stated above since they are conveniently prepared by the reaction of an alkali metal double salt of a dihydric phenol and a dihalobenzenoid compound having an electron withdrawing group as is described more fully herein.

The residuum E of the dihydric phenol can be, for instance, a mononuclear phenylene group as results from hydroquinone and resorcinol, or it may be a di- or polynuclear residuum. The residuum E can also be substituted with other nuclear substituents such as halogen, alkyl, alkoxy and like inert substituents.

It is preferred that the dihydric phenol be a weakly acidic dinuclear phenol such as, for example, the dihydroxy diphenyl alkanes or the nuclear halogenated derivatives thereof, which are commonly known as "bis-phenols," such as, for example, the 2,2-bis-(4-hydroxyphenyl)propane, 1,1 - bis - (4 - hydroxyphenyl)-2-phenyl-ethane, bis-(4-hydroxyphenyl)methane, or the chlorinated derivatives containing one or two chlorines on each aromatic ring. Other suitable dinuclear dihydric phenols are the bisphenols of a symmetrical or unsymmetrical joining group as, for example, ether oxygen (—O—), carbonyl (—CO—), sulfide (—S—), sulfone (—SO₂—), or hydrocarbon residue in which the two phenolic nuclei are joined to the same or different carbon atoms of the residue such as, for example, the bisphenol of acetophenone, the bisphenol of benzophenone, the bisphenol of vinyl cyclohexene, the bisphenol of α-pinene, and the like bisphenols where the hydroxyphenyl groups are bound to the same or different carbon atoms of an organic linking group.

Such dinuclear phenols can be characterized as having the structure:

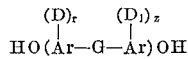

wherein Ar is an aromatic group and preferably is a phenylene group, D and $D_1$ can be the same or different inert substituent groups as alkyl groups having from 1 to 4 carbon atoms, halogen atoms, i.e. fluorine, chlorine, bromine, or iodine, or alkoxy radicals having from 1 to 4 carbon atoms, r and z are integers having a value of from 0 to 4, inclusive, and G is representative of a bond between aromatic carbon atoms as in dihydroxydiphenyl, or is a divalent radical, including for example, inorganic radicals as —CO—, —O—, —S—, —S—S—, —SO₂—, and divalent organic hydrocarbon radicals such as alkylene, alkylidene, cycloaliphatic, or the halogen, alkyl, aryl or like substituted alkylene, alkylidene and cycloaliphatic radicals as well as alkalicyclic, alkarylene and aromatic radicals and a ring fused to both Ar groups.

Examples of specific dihydric polynuclear phenols include among others: the bis-(hydroxyphenyl)alkanes such as 2,2-bis(4-hydroxyphenyl)propane,
2,4'-dihydroxydiphenyl-methane,
bis-(2-hydroxyphenyl)methane,
bis-(4-hydroxyphenyl)methane,
bis-(4-hydroxy-2,6-dimethyl-3-methoxyphenyl)methane,
1,1-bis-(4-hydroxyphenyl)ethane,
1,2-bis-(4-hydroxyphenyl)ethane,
1,1-bis-(4-hydroxy-2-chlorophenyl)ethane,
1,1-bis-(3-methyl-4-hydroxyphenyl)propane,
1,3-bis-(3-methyl-4-hydroxyphenyl)propane,
2,2-bis-(3-phenyl-4-hydroxyphenyl)propane,
2,2-bis-(3-isopropyl-4-hydroxyphenyl)propane,
2,2-bis-(2-isopropyl-4-hydroxyphenyl)propane,
2,2-bis-(4-hydroxynaphthyl)propane,
2,2-bis-(4-hydroxyphenyl)pentane,
3,3-bis-(4-hydroxyphenyl)pentane,
2,2-bis-(4-hydroxyphenyl)heptane,
bis-(4-hydroxyphenyl)phenylmethane,
2,2-bis-(4-hydroxyphenyl)-1-phenylpropane,
2,2-bis-(4-hydroxyphenyl)-1,1,1,3,3,3-hexafluoropropane
and the like;

Di(hydroxyphenyl)sulfones such as bis-(4-hydroxyphenyl)sulfone, 2,4'-dihydroxydiphenyl sulfone, 5'-chloro-2,4'-dihydroxydiphenyl sulfone, 5'-chloro-4,4'-dihydroxydiphenyl sulfone, and the like;

Di(hydroxyphenyl)ethers such as bis-(4-hydroxyphenyl) ether, the 4,3'-, 4,2'-, 2,2'-, 2,3'-dihydroxydiphenyl ethers, 4,4'-dihydroxy-2,6-dimethyldiphenyl ether,
bis-(4-hydroxy-3-isobutylphenyl)ether,
bis-(4-hydroxy-3-isopropylphenyl)ether,
bis-(4-hydroxy-3-chlorophenyl)ether,
bis-(4-hydroxy-3-fluorophenyl)ether,
bis-(4-hydroxy-3-bromophenyl)ether,
bis-(4-hydroxynaphthyl)ether,
bis-(4-hydroxy-3-chloronaphthyl)ether,
4,4'-dihydroxy-3,6-dimethoxydiphenyl ether,
4,4'-dihydroxy-2,5-diethoxydiphenyl ether, and like materials.

It is also contemplated to use a mixture of two or more different dihydric phenols to accomplish the same ends as above. Thus when referred to above the E residuum in the polymer structure can actually be the same or different aromatic residua.

As used herein, the E term defined as being the "residuum of the dihydric phenol" refers to the residue of the dihydric phenol after the removal of the two aromatic hydroxyl groups. Thus, it is readily seen that polyarylene polyethers contain recurring groups of the residuum of the dihydric phenol and the residuum of the benzenoid compound bonded through aromatic ether oxygen atoms.

The residuum E' of the benzenoid compound can be from any dihalobenzenoid compound or mixture of dihalobenzenoid compounds which compound or compounds have the two halogens bonded to benzene rings having an electron withdrawing group in at least one of the positions ortho and para to the halogen group. The dihalobenzenoid compound can be either mononuclear where the halogens are attached to the same benzenoid ring or polynuclear where they are attached to different benzenoid rings, as long as there is the activating electron withdrawing group in the ortho or para position of that benzenoid nucleus.

Any of the halogens may be the reactive halogen substituents on the benzenoid compounds, fluorine and chlorine substituted benzenoid reactants being preferred.

Any electron withdrawing group can be employed as the activator group in the dihalobenzenoid compounds. Preferred are the strong activating groups such as the sulfone groups ($-SO_2-$) bonding two halogen substituted benzenoid nuclei as in the 4,4'-dichlorodiphenyl sulfone and 4,4'-difluorodiphenyl sulfone, although such other strong withdrawing groups hereinafter mentioned can also be used with ease. It is further preferred that the ring contain no electron supplying groups on the same benzenoid nucleus as the halogen; however, the presence of other groups on the nucleus or in the residuum of the compound can be tolerated. Preferably, all of the substituents on the benzenoid nucleus are either hydrogen (zero electron withdrawing), or other groups having a positive sigma* value, as set forth in J. F. Bunnett in Chem. Rev., 49, 273 (1951) and Quart. Rev., 12, 1 (1958).

The electron withdrawing group of the dihalobenzenoid compound can function either through the resonance of the aromatic ring, as indicated by those groups having a high sigma* value, i.e. above about +0.7 or by induction as in perfluoro compounds and like electron sinks.

Preferably the activating group should have a high sigma* value, preferably above 1.0, although sufficient activity is evidenced in those groups having a sigma* value above 0.7.

The activating group can be basically either of two types:

(a) monovalent groups that activate one or more halogens on the same ring as a nitro group, phenylsulfone, or alkylsulfone, cyano, trifluoromethyl, nitroso, and hetero nitrogen as in pyridine.

(b) divalent groups which can activate displacement of halogens on two different rings, such as the sulfone group $-SO_2-$; the carbonyl group $-CO-$; the vinyl group $-CH=CH-$; the sulfoxide group $-SO-$; the azo group $-N=N-$; the saturated fluorocarbon groups $-CF_2-CF_2-$; organic phosphine oxides

where Q is a hydrocarbon group, and the ethylidene group

where X can be hydrogen or halogen or which can activate halogens on the same ring as with difluorobenzoquinone, 1,4- or 1,5- or 1,8-difluoroanthraquinone.

If desired, the polymers may be made with mixtures of two or more dihalobenzenoid compounds each of which has this structure, and which may have different electron withdrawing groups. Thus, the E' residuum of the benzenoid compounds in the polymer structure may be the same or different.

It is seen also that as used herein, the E' term defined as being the "residuum of the benzenoid compound" refers to the aromatic or benzenoid residue of the compound after the removal of the halogen atoms on the benzenoid nucleus.

From the foregoing, it is evident that preferred linear thermoplastic polyarylene polyethers are those wherein E is the residuum of a dinuclear dihydric phenol and E' is the residuum of a dinuclear benzenoid compound. These preferred polymers then are composed of recurring units having the formula

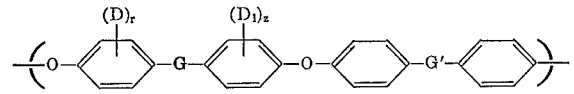

wherein G represents a member of the group consisting of a bond between aromatic carbon atoms and a divalent connecting radical and G' represents a member of the group consisting of sulfone, carbonyl, vinyl, sulfoxide, azo, saturated fluorocarbon, organic phosphine oxide and ethylidene groups and D and $D_1$ each represent inert substituent groups selected from the group consisting of halogen, alkyl groups having from 1 to 4 carbon atoms and alkoxy groups having from 1 to 4 carbon atoms and where r and z are integers having a value from 0 to 4 inclusive. Even more preferred are the thermoplastic polyarylene polyethers of the above formula wherein r and z are zero, G is divalent connecting radical

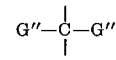

wherein G" represents a member of the group consisting of hydrogen, lower alkyl, lower aryl, and the halogen substituted groups thereof, and G' is a sulfone group.

Thermoplastic polyarylene polyethers described herein can be prepared in a substantially equimolar one-step reaction of a double alkali metal salt of a dihydric phenol with a dihalobenzenoid compound in the presence of specific liquid organic sulfoxide or sulfone solvents under substantially anhydrous conditions. Any alkali metal salt of the dihydric phenol can be used as the one reactant.

Thermoplastic polyarylene polyethers described herein can also be prepared in a two-step process in which a dihydric phenol is first converted in situ in a primary reaction solvent to the alkali metal salt by the reaction with the alkali metal, the alkali metal hydride, alkali metal hydroxide, alkali metal alkoxide or the alkali metal alkyl compounds. The preparation of a specific polyarylene polyether is detained in Example 1 below and the one-step and two-step processes referred to above are described in detail in U.S. Pat. 3,264,536, issued Aug. 2, 1966.

In preparing the polyarylene polyether chains for use in this invention, the reactive group $-OM$, where M represents an alkali metal such as sodium or potassium, can be placed at each end of the polymer chain by using a molar excess of dihydric phenol.

Glass transition temperature ($T_g$), commonly referred to as the second order phase transition temperature, refers to the inflection temperatures found by plotting the resilience (recovery from one percent elongation) of a film ranging in thickness from 3 to 15 mils against the temperature. See Brown, Textile Research Journal, 25, 891 (1955).

Reduced viscosity (RV) is determined by dissolving a 0.2 gram sample of thermoplastic polyarylene polyether in dichloromethane in a 100 ml. volumetric flask so that the resultant solution measures exactly 100 ml. at 25° C. in a constant temperature bath. The viscosity of 10 ml. of the solution which has been filtered through a sintered glass funnel is determined in viscometer at 25° C. Reduced viscosity values are obtained from the equation:

$$\text{Reduced viscosity} = \frac{t_s - t_o}{c \cdot t_o}$$

wherein:

$t_o$ is the efflux time of the pure solvent
$t_s$ is the efflux time of the polymer solution
$c$ is the concentration of the polymer solution expressed in terms of grams of polymer per 100 ml. of solution.

EXAMPLES 1-4

Polyarylene polyether general procedure

The desired amount of dihydric phenol is charged to a flask containing a solvent mixture of monochlorobenzene and dimethyl sulfoxide. The phenol is converted to the di sodium salt in situ by adding the required amount of NaOH. The system is dehydrated by heating and removing the monochlorobenzene-water azeotrope. The desired amount of dihalo benzenoid compound is then added and reacted with the sodium salt of the phenol at about 140° C. The polymer is recovered by precipitating, filtering, washing and drying. The molecular weight of the polymer is controlled by the amounts of monomers used and to produce a hydroxy terminated polymer a molar excess of phenol is employed. The polymer is treated with acid, such as oxalic, hydrochloric and citric acids, to convert the terminal —ONa group to —OH groups.

Block copolymer general procedure

A four-neck, 500 ml. flask is fitted with a mechanical stirrer, a reflux condenser, a nitrogen inlet and stopcock. After heating to dry the apparatus and flushing with dry nitrogen, the desired amount of hydroxy terminated polyarylene polyether is charged to the flask with a sufficient suitable solvent to dissolve the polymer. Suitable solvents include tetrahydrofuran, chlorobenzene, and the like. A portion of the solvent is then distilled out to remove any traces of moisture. While refluxing, the desired amount of polysiloxane having terminal groups capable of reacting with the —OH groups of the polyarylene polyether is added slowly. The block copolymer is isolated by removing the solvent by suitable techniques such as flash distillation under vacuum, coagulation and the like.

In these examples, OH terminated polyarylene polyether is prepared following the general procedure from a molar excess 2,2'-bis(4-hydroxyphenyl)propane, also known as bisphenol A, and 4,4'-dichlorodiphenyl sulfone and has the repeating unit

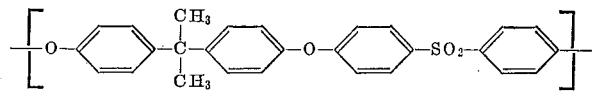

Hydrolytically stable copolymers are prepared following the general procedure. Examples using bis(dimethylamine) terminated polydimethylsiloxane are summarized in the following table:

bisphenol of benzophenone and 4,4'-dichlorodiphenyl sulfone. A hydrolytically stable copolymer containing 29 percent by weight siloxane is prepared following the general procedure using a bis(dimethylamine) terminated polydimethyl siloxane having a molecular weight of 5000.

EXAMPLE 7

Following the polyarylene polyether general procedure, a hydroxyl terminated polymer having a molecular weight of 7,500 is prepared from 4,4'-dichlorodiphenyl sulfone and a molar excess of the 4,4'-bisphenol of vinyl cyclohexene (prepared by an acid catalyzed condensation of 2 moles of phenol with one mole of vinyl cyclohexene). A hydrolytically stable copolymer containing 50 percent by weight siloxane is prepared following the general procedure using a chloro-terminated polydiphenyl siloxane having a molecular weight of 7,500.

EXAMPLE 8

Following the polyarylene polyether general procedure, a hydroxyl terminated polymer having a molecular weight of 20,000 is prepared from a molar excess of bisphenol A and 4,4'-difluorobenzophenone.. A hydrolytically stable copolymer containing 20 percent by weight siloxane is prepared following the general procedure using bis(dimethylamine) terminated polydimethyl siloxane having a molecular weight of 5000.

EXAMPLE 9

Following the polyarylene polyether general procedure, a hydroxyl terminated polymer having a molecular weight of 5000 is prepared from 4,4' - difluorodiphenylbenzophenone and a molar excess of hydroquinone. A hydrolytically stable copolymer containing 89 percent by weight siloxane is prepared following the general procedure using bis(dimethylamine) terminated polydimethylsiloxane having a molecular weight of 40,000.

EXAMPLE 10

Following the polyarylene polyether general procedure, a hydroxyl terminated polymer having a molecular weight of 45,000 is prepared from a molar excess of bisphenol A and 2,5-dichloronitrobenzene. A hydrolytically stable copolymer containing 18 percent by weight siloxane is prepared following the general procedure using a bis(dimethylamine) terminated polydimethylsiloxane having a molecular weight of 10,000.

| Example No. | Polyarylene polyether molecular weight | Polysiloxane molecular weight | Percent siloxane in copolymer | RV of copolymer * | Tensile modulus, p.s.i. | Tensile strength, p.s.i. | Percent elongation | $T_g$° C. |
|---|---|---|---|---|---|---|---|---|
| 1 | 1,500 | 350 | 22.5 | 0.46 | | | | +80 |
| 2 | 4,700 | 350 | 10.7 | 0.41 | 240,000 | 6,000 | 5 | +120 |
| 3 | 6,600 | 1,700 | 24.2 | 1.14 | 170,000 | 4,700 | 12 | +150 |
| 4 | 4,700 | 1,700 | 35 | 0.33 | 151,000 | 5,400 | 3 | +140 |

*RV of copolymer determined at 0.2 g./dl. in dichloromethane of 25° C.

The copolymers of Examples 1-4 are exposed to atmospheric moisture for 40 days without any change in their initial RV given in the table alone. This demonstrates that these copolymers possess excellent yet unexpected hydrolytic stability.

EXAMPLE 5

Following the polyarylene polyether general procedure, a hydroxyl terminated polymer having a molecular weight of 5000 is prepared from 4,4'-dichlorodiphenyl sulfone and a molar excess of 4,4'-dihydroxydiphenyl sulfone. A hydrolytically stable copolymer containing 50 percent by weight siloxane is prepared following the general procedure using bis(dimethylamine) terminated polydimethylsiloxane having a molecular weight of 5000.

EXAMPLE 6

Following the polyarylene polyether general procedure, a hydroxyl terminated polymer having a molecular weight of 12,000 is prepared from a molar excess of the 4,4'-

EXAMPLE 11

Following the polyarylene polyether general procedure, a hydroxyl terminated polymer having a molecular weight of 5,000 is prepared from 4,4'-dichloroazobenzene and a molar excess of resorcinol. A hydrolytically stable copolymer containing 50 percent by weight siloxane is prepared following the general procedure using bis(dimethylamine) terminated copolymer containing 97% dimethyl siloxane units and 3% vinylmethyl siloxane units having a molecular weight of 5000. The environmental resistance, especially under stress, to solvents, elevated temperatures and the like, of the copolymers of this example, as well as other copolymers of this invention, is greatly enhanced by crosslinking through the vinyl groups by any of several well known methods, for example peroxide, irradiation and the like.

The block copolymers are useful per se for the formation of injection moldings, compression moldings, extrusions, film and spray coatings, sealants and adhesives.

They can also be used to form latices from which foam or dipped goods may be prepared and in compositions with other polymers. Certain compositions also display excellent abrasion resistance. Cross-linked block copolymers having good environmental resistance are especially useful in moldings and extrusions and especially in wire and cable insulation.

The polyarylene polyethers used in Examples 5–11 are composed of recurring units having the formulas:

Example 5:

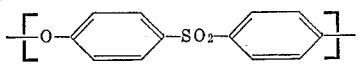

Example 6:

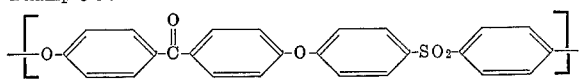

Example 7:

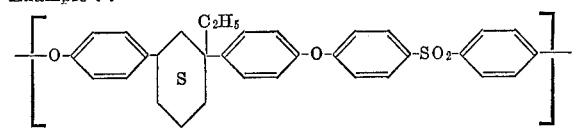

Example 8:

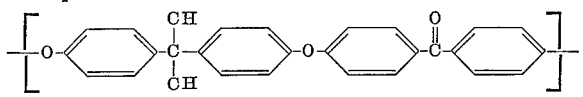

What is claimed is:

1. Hydrolytically stable siloxane-polyarylene polyether copolymer comprising (A) at least one siloxane chain having at least two siloxane units represented by the formula

wherein R is a monovalent hydrocarbon group, a substituted monovalent hydrocarbon group wherein each substituent is a halogen atom, an oxygen atom of an epoxy group or a hydroxy, cyano, alkoxy, amino, amido, isocyanato, nitro, or ester group, or ether oxygen (—O—) and $b$ has a value from 1 to 3 inclusive, said siloxane chain containing at least one of said siloxane units wherein at least one R is ether oxygen which links the siloxane chain to a polyarylene polyether chain by an aryloxy to silicon bond and (B) at least one linear thermoplastic polyarylene polyether chain composed of recurring units having the formula

wherein E is the residuum of a dihydric phenol and E' is the residuum of a benzenoid compound having an inert electron withdrawing group having a sigma* value above about +0.7 ortho or para to the valence bonds, both of said residua being valently bonded to the ether oxygens through aromatic carbon atoms.

2. Copolymer of claim 1 wherein said siloxane chain is linear.

3. Copolymer of claim 1 wherein said siloxane chain is polydimethylsiloxane.

4. Copolymer of claim 1 wherein said polyarylene polyether chain is composed of recurring units having the formula

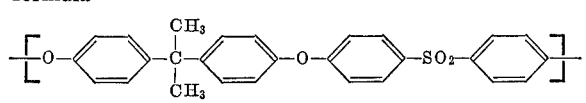

5. Copolymer of claim 1 wherein said polyarylene polyether chain is composed of recurring units having the formula

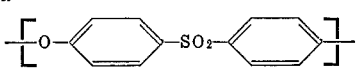

6. A copolymer as claimed in claim 1 wherein at least one group represented by R is a substituted monovalent hydrocarbon group wherein each substituent is a halogen atom.

7. A copolymer as claimed in claim 1 wherein at least one group represented by R is a 3,3,3-trifluoropropyl group.

8. A copolymer as claimed in claim 1 wherein each group represented by R is a monovalent hydrocarbon group or ether oxygen.

References Cited

UNITED STATES PATENTS

| | | | |
|---|---|---|---|
| 3,063,872 | 11/1962 | Boldebuck | 260—824 |
| 3,402,143 | 9/1968 | Hay | 260—824 |
| 3,417,053 | 12/1968 | Chalk | 260—824 |
| 3,423,479 | 1/1969 | Hendricks | 260—824 |

SAMUEL H. BLECH, Primary Examiner

U.S. Cl. X.R.

117—161; 260—2.5, 29.6, 47, 49